(No Model.)

H. D. HIBBARD.
WHEEL.

No. 578,637. Patented Mar. 9, 1897.

WITNESSES:

INVENTOR
Henry D. Hibbard
BY
Howson and Howson
ATTORNEYS

UNITED STATES PATENT OFFICE.

HENRY D. HIBBARD, OF HIGH BRIDGE, NEW JERSEY, ASSIGNOR TO THE TAYLOR IRON AND STEEL COMPANY, OF SAME PLACE.

WHEEL.

SPECIFICATION forming part of Letters Patent No. 578,637, dated March 9, 1897.

Application filed July 6, 1896. Serial No. 598,187. (No model.)

*To all whom it may concern:*

Be it known that I, HENRY D. HIBBARD, a citizen of the United States, and a resident of High Bridge, Hunterdon county, New Jersey, have invented Improvements in Car-Wheels, Pulleys, &c., of which the following is a specification.

My invention relates to the construction of car-wheels and other wheels, pulleys, and other such articles which, because of the hardness of their metal or for other reasons, have to be bushed in order that they may be fitted upon their shafts or journals. I have in mind more particularly wheels or pulleys made of manganese steel, which is so hard that it is practically impossible to do that amount of machining which is necessary to fit the different wheels or pulleys to the different shafts, axles, or journals for which they are intended. The difficulty has been met by bushing such wheels or pulleys with a bushing of a metal which can be bored or turned.

My invention consists of an improved construction of bushed wheel or pulley or other such article, such that it can be made more easily and of more uniform quality and that it will adapt itself to the construction of special styles of wheels or pulleys.

Figure 1:
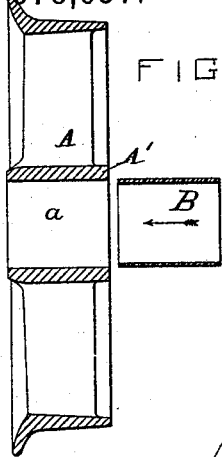
Figure 2:
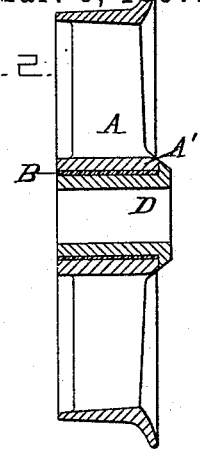
Figure 3:
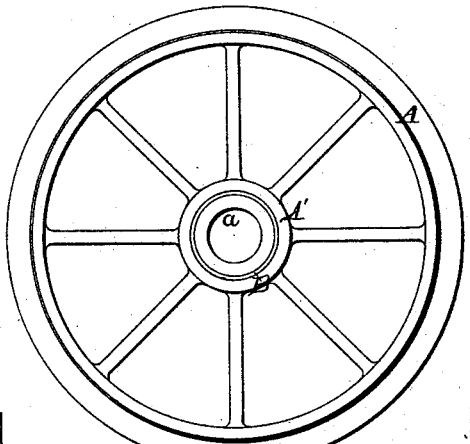
Figure 4:
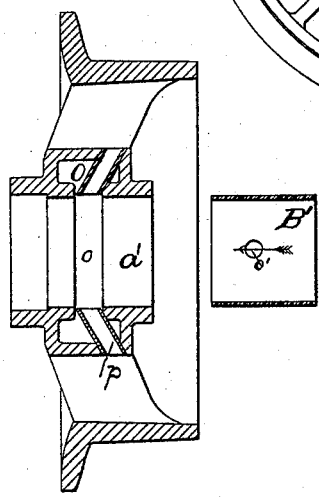
Figure 5:
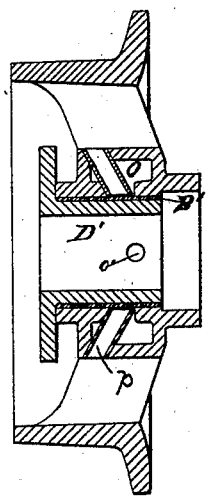

In the accompanying drawings, Figure 1 is a sectional view illustrating the manner of making a car-wheel according to my invention. Fig. 2 is a sectional view of the bushed wheel. Fig. 3 is a face view. Fig. 4 is a sectional view illustrating the construction of a self-oiling car-wheel according to my invention, and Fig. 5 is a sectional view of the wheel as completed.

Although in the drawings I have shown my invention as applied to car-wheels, I wish it to be understood that I do not restrict myself thereto, as it may be applied to other wheels or pulleys or propellers with good effect.

In carrying out my invention the body A is cast of manganese steel with an opening $a$ in the hub A' as nearly central as may be and of a diameter somewhat larger than the diameter of the shaft, axle, or journal on which it is to go. Of course it is intended that this hole $a$ shall be cast as true in relation to the rim of the wheel as it can be. The inside of this opening in the hub is then smoothed by means of an emery-spindle sufficiently to remove lumps or protuberances.

A pipe or thin bushing B, of relatively soft metal, wrought-iron, or brass, for instance, is selected of a size such as to nearly fit the opening $a$. For this I can usually employ one or other of the various sizes and styles of pipe to be found on the market. I prefer to have one of such a diameter and fit as to require pressure to force it into place in the hub of the wheel, but as the castings vary, just the right size cannot always be had. The next step after this pipe or bushing is in position is to expand it firmly into its place by means of a suitable expanding-tool. I then bore the interior of this thin bushing preferably true to itself and without regard to the rim of the wheel, this boring being to provide a trued seat for the inner and thicker bushing D, which has now to go in. This inner bushing, which may be of cast-iron, brass, or other suitable metal, has its exterior trued up to correspond exactly with the internal diameter of the thin metal bushing B, or, in other words, it is made what is termed a "forcing fit." This bushing D is now forced into place by hydraulic pressure. The inserted bushing is then bored true or central with the rim or periphery of the wheel or pulley to the proper size for the axle, shaft, or journal to which it is to be made fast or on which it is to turn. If the wheel or pulley is to be a fast one, the hub will have to be key-seated.

In a former method of making bushed manganese-steel wheels the wheel was cast about a thin annular facing and the inner bushing afterward inserted in the latter.

My construction of wheel possesses the advantage over the prior construction referred to in that the hub of the wheel can be cast lighter and thinner and more nearly of the thickness of the other parts of the casting than was possible when the wheel was cast about the thin bushing. The more uniform the thickness of the different parts of the casting the more easily can it be cast and water-toughened and the better and more uniform will be the quality of the casting. My construction also lends itself more readily than the prior construction to the making of self-oiling wheels, of which I will now describe one construction. (Illustrated in Figs. 4 and 5.)

The wheel is cast with a large oil-cavity O, Fig. 4, a simple formation of core being possible by reason of the fact that I can leave a large annular opening $o$ from the oil-cavity to the axial opening $a'$, which, as before, is made larger than the journal on which the wheel is to run. One or more oblique oil-supply tubes $p$ may be cast in, as shown in Fig. 4.

A thin pipe or first bushing B' is inserted and then expanded into place by a suitable expanding-tool and then bored out. The inner bushing D' is then driven in with a forcing fit and bored true to suit the journal on which the wheel has to run. The bushings B' and D' have the oil-holes $o'$ formed in them before they are inserted.

I claim as my invention—

1. A car-wheel or other such article of manganese steel or other metal which practically cannot be machined, said article having a thin metal bushing expanded into place in its hub and another bushing fixed into the expanded bushing, substantially as described.

2. A car-wheel or other such article of manganese steel or other metal which practically cannot be machined, said article being cast with an oil-cavity and an opening therefrom to the axial hole, a thin bushing expanded into the latter and another bushing fixed into the expanded bushing, the bushings having openings for the passage of oil, substantially as described.

In testimony whereof I have signed my name to this specification in the presence of two subscribing witnesses.

HENRY D. HIBBARD.

Witnesses:
   THOS. RICKARD,
   ROBERT D. DUKE.